2,823,696

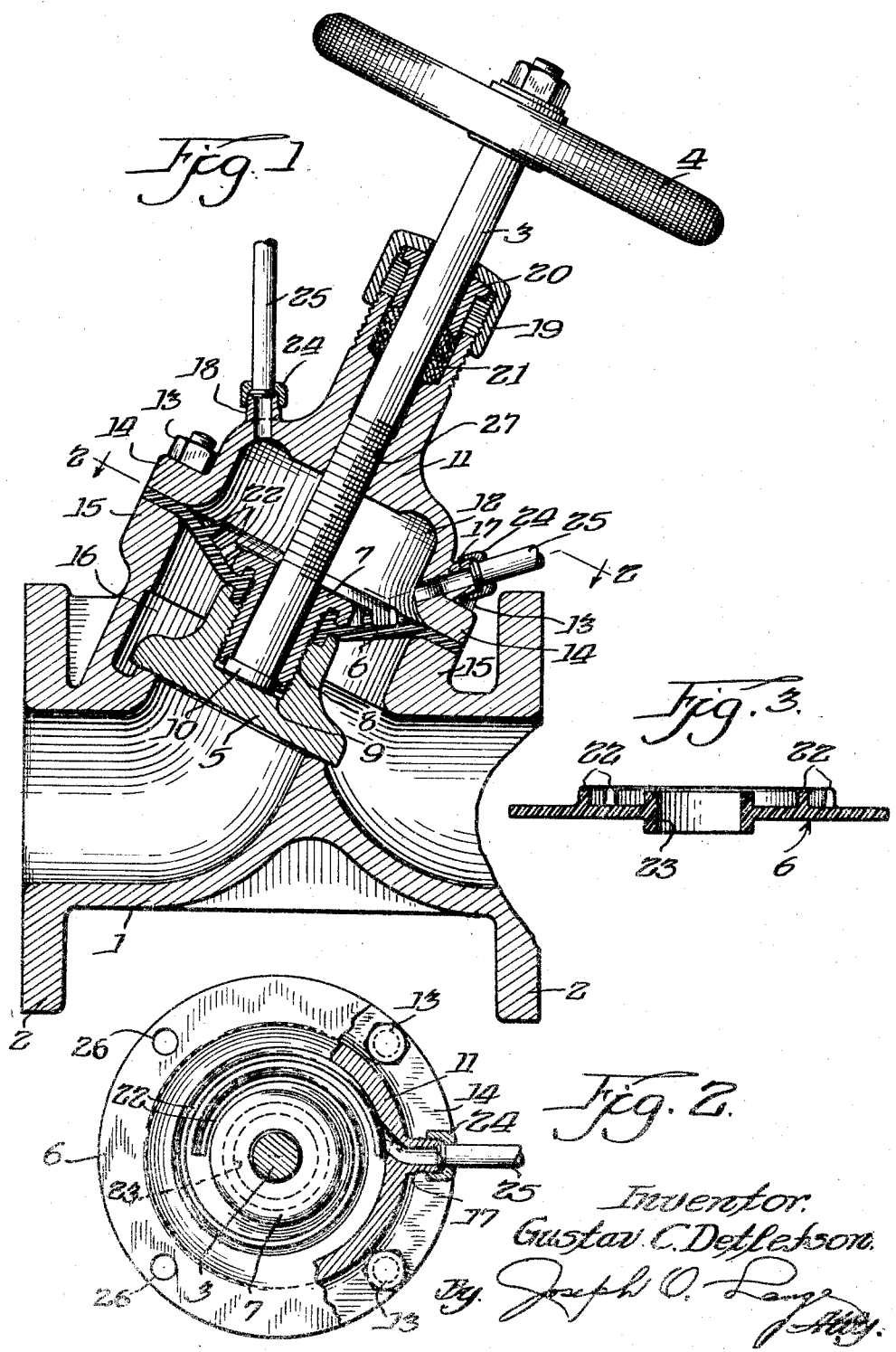

FLUID COOLED DIAPHRAGM VALVE

Gustav C. Detlefson, Chicago, Ill., assignor to Crane Co., Chicago, Ill., a corporation of Illinois Application January 4, 1954, Serial No. 401,777

3 Claims. (Cl. 137—340)

This invention relates to an improvement in that type of valve known to those skilled in the art as a diaphragm valve. More particularly, it pertains to a novel bonnet and diaphragm design which will allow a cooling fluid, or a heating fluid if desired, to circulate, for example, for heat exchange purposes in the bonnet in the normal course of valve operation.

Heretofore, in explanation of the background of this invention, it should be understood that in many cases the diaphragm type of valve has been limited in its operation frequently by the temperature of the product in the pipeline. Since the valve diaphragm is of necessity flexible, it is normally composed of a plastic composition, rubber, or like substances of comparatively limited operating range temperaturewise, thus limiting the maximum or minimum temperatures allowable in the piping system.

It is, therefore, a prime object of the present invention to provide a valve structure wherein a fluid, such as a cooling medium may be circulated through the valve bonnet in direct contact with the diaphragm surface in the normal course of valve operation, thereby increasing the maximum operating temperature allowable in valves of this type.

Similarly, warm fluid mediums may be circulated through the valve bonnet under operating conditions in which the valve is subject to sticking or freezing in open or closed positions as a result of the low operating temperatures prevalent. Consequently, any fluid having the desirable heat exchange value or capacity may be employed in those valve structures embodying my invention.

It is a further object of my invention to insure a continuous state of fluid turbulence within the bonnet chamber thereby effecting a uniform cooling of the exposed diaphragm surface as will hereinafter be explained in greater detail.

Other objects and advantages will become more manifest upon proceeding with the following detailed description read in the light of the accompanying drawings, in which Fig. 1 is a fragmentary sectional assembly view of a diaphragm valve employing my invention.

Fig. 2 is a fragmentary sectional view, partly in elevation, taken on line 2—2 of Fig. 1.

Fig. 3 is a diametric sectional view of the diaphragm employed in the illustrated valve structure.

Similar reference numerals refer to similar parts throughout the several views.

Referring now to Fig. 1, a valve body or casing generally designated 1 is shown having conventional flange ends 2 for the usual connection with a pipeline (not shown), although other means of pipeline attachment will obviously work to similar advantage. A valve stem 3 having a handwheel 4 attached to its upper extremity, and having a closure member 5 attached to its lower extremity effects a fluid-tight seal with the flexible diaphragm member 6 by means of the interposed disc stem ring 7 which is threaded as at 8 for engagement with the closure member 5. The stem ring 7 in addition prevents line fluid pressure in the casing chamber 16 from forcing and straining the diaphragm upwards into the bonnet recess by serving as a suitable reinforcement of the back or upper surface portion of the diaphragm 6.

The closure member 5 also is provided with a hollow recess 9 which allows the stemhead end portion 10 to revolve relatively freely while the closure member and diaphragm are raised or lowered in the normal course of valve operation.

It will be apparent that the bonnet 11 and the diaphragm 6 combine to form a bonnet chamber 12 which is maintained fluid tight at the bonnet-diaphragm interface portions. A suitable number of nut and bolt assemblies 13 compress the diaphragm periphery between the bonnet flange 14 and the casing flange 15 thereby enabling the diaphragm 6 to act as a common fluid-tight wall between the bonnet chamber 12 and the valve or casing chamber 6.

An inlet 17 which may be cast integral with the bonnet 11 as shown allows any fluid having proper heat exchange properties to enter the bonnet chamber 12, transmitting or absorbing heat from the top surface of the diaphragm 6, and thereafter to emerge in a continuous stream therefrom through the outlet 18. The circulating fluid conduit termini 25 may be maintained in fluid tight relationship with inlet 17 and outlet 18 by means of the usual union rings 24 which threadedly engage the bonnet chamber entrance and exit as shown.

Attention should at this time be given to the preferred positioning of the fluid inlet 17 and outlet 18 in the valve bonnet 11. The inlet 17 is positioned in a lower plane on the bonnet and enters the chamber 12 preferably tangential to the bonnet surface as shown in Fig. 2, thereby to impart a circulatory motion to the entering fluid. The outlet, however, is positioned in a higher plane on the bonnet 11 as depicted in Fig. 1, so that circulation of the water or other fluid is assured over the entire diaphragm surface. Thus, a rapid and ineffectual passage or flow of the entering fluid through the bonnet 11 is prevented.

It should be understood that whereas water would undoubtedly be employed in the majority of cases embodying my invention, any fluid capable of manageable flow through the valve bonnet may be used and obviously falls within the spirit of my invention.

Fluid therewithin is prevented from escaping the bonnet chamber 12 through the stem opening by means of the conventional stuffing box comprising the usual packing nut 19, gland 20, and the packing 21.

It is, of course, obvious that the valve operator may regulate the temperature of the circulating fluid by passing the gas or liquid through a refrigerating or heating unit (not shown) which may be interposed between the outlet 18 and inlet 17.

It should also be quite apparent that under ordinary operating conditions where extreme cold or heat are not present, the passage of a cooling or heating fluid through the bonnet 11 is unnecessary. Consequently, the valve inlet and outlets may be suitably plugged, or left open to allow air circulation, until extreme operating temperatures require the passage of an appropriate heat exchange medium over the diaphragm surface as hereinabove described.

Particular attention will now be given to Fig. 2 which depicts the desired relative positioning of the inlet 17 and the terminus of the relieved diaphragm portion 22, which latter positioning is facilitated by means of the diaphragm apertures 26. It will be noticed that relieved diaphragm portion 22 is formed on the upper or bonnet chamber surface of the diaphragm 6 with ribbing in the configuration of a spiral. The nature of the relieved diaphragm portion 22 is more clearly revealed in Fig. 3. The diaphragm should be so positioned within the valve that the outer terminus of the spiral is preferably adjacent the fluid inlet 17 as depicted in Fig. 2. Consequently, fluid entering through the inlet 17 has imparted to it a whirling motion by the relieved portion 22, thereby preventing the entering fluid from flowing directly to the outlet 18. Thus, a turbulent whirling motion is assured allowing an even heat-absorbing condition to exist over the upper diaphragm surface.

Although the stem 3, as illustrated, is of the rising type threadedly engaging the bonnet 11 at 27, it should be clear that a non-rising stem may be utilized if a recessed closure member, such as that depicted in Fig. 4 of U. S. Patent No. 2,504,057, is employed. Also, whereas a ribbed or relieved diaphragm is depicted embodying my invention, it is of course possible to use the ordinary smooth surface diaphragm usually employed in valves of this type and still partially obtain the benefit of the bonnet chamber fluid cooling or heating effect by employing the bonnet design previously described.

The central apertured diaphragm depicted is necessitated by the separate closure member 5. However, those unapertured diaphragms which employ no separate closure member will obviously function equally well.

Thus, it is apparent that in the illustrated simple and inexpensive valve structure I have devised a new and novel valve bonnet and diaphragm structure which arrangement has increased the operating temperature range of the valves of the described type. Numerous applications of my invention have been described in detail illustrating the flexibility embodied therein.

What has been described is therefore obviously subject to numerous changes and modifications which may be made without departing from the essential spirit of the invention as determined by the appended claims.

I claim:
1. In a diaphragm valve, the combination comprising a bonnet, a casing therefor, a flexible diaphragm interposed therebetween, said diaphragm effecting a fluid tight seal between said bonnet and said casing when said valve is in the normally assembled position, the upper surface of said diaphragm being of frusto-conical form and having a relieved portion in the configuration of a spiral, said bonnet having entrance and exit apertures, the said entrance aperture directing fluid flow against said spiral configuration whereby a fluid medium may be circulated therethrough and over the diaphragm relieved portion to define a substantially spiral travel of the medium being circulated.

2. In a diaphragm valve, the combination comprising a casing having a fluid passageway therethrough, a bonnet cooperating therewith having an inner annular wall surface, a flexible diaphragm positioned between said casing and said bonnet when said valve is in the normally assembled position, said flexible diaphragm having a relieved portion of spiral configuration integral with its upper surface, said bonnet having a fluid entrance substantially tangential to said bonnet wall surface, the said fluid entrance directing fluid flow against said spiral configuration, and said bonnet also having a fluid exit.

3. In a diaphragm valve, a bonnet chamber, said bonnet chamber being defined by a bonnet member and a flexible diaphragm in fluid tight engagement therewith, a portion of said bonnet member having a fluid entrance substantially tangential to the inner surface of said bonnet member defining the outer limits of the said bonnet chamber, said bonnet member also having a fluid exit positioned in the upper portion thereof, said flexible diaphragm having a spiral-like relieved portion projecting into said bonnet chamber whereby fluid entering said bonnet member entrance impinges against said spiral-like relieved portion thereby to assume a whirling motion in the course of its movement through said bonet member.

References Cited in the file of this patent

UNITED STATES PATENTS

| | | |
|---|---|---|
| 698,474 | Ebbs | Apr. 29, 1902 |
| 2,444,703 | Jones | July 6, 1948 |
| 2,504,057 | Trefil | Apr. 11, 1950 |
| 2,698,162 | Riesgo | Dec. 28, 1954 |

FOREIGN PATENTS

| | | |
|---|---|---|
| 538,945 | Germany | Nov. 23, 1931 |